Sept. 24, 1940.   S. I. BACON   2,215,659
INTERLOCK PIPE COUPLING
Filed Oct. 10, 1939
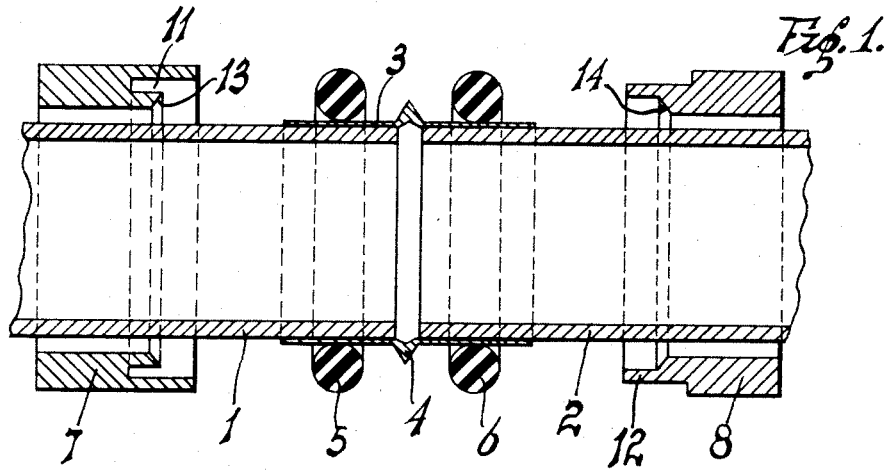
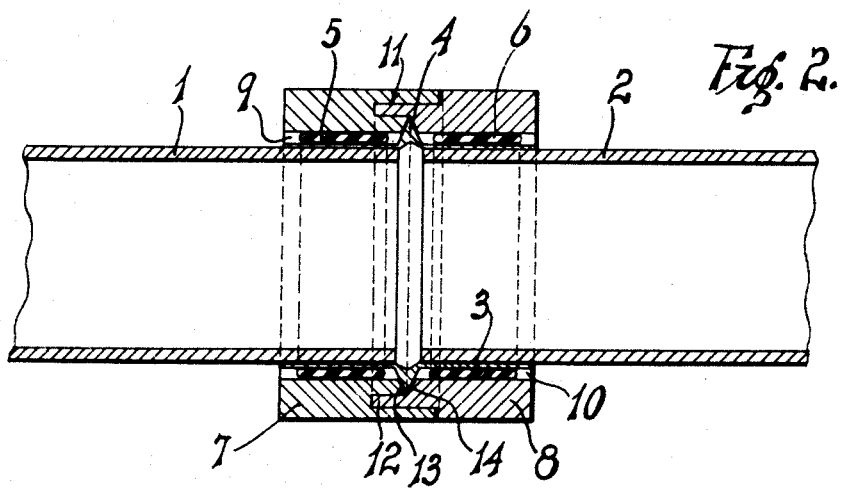
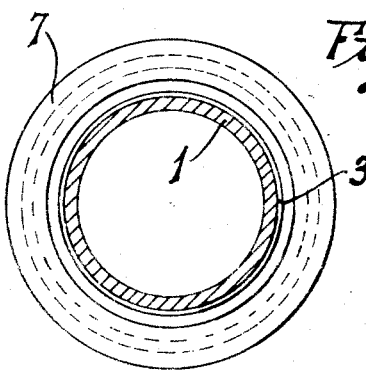
INVENTOR.
SIDNEY I. BACON.
BY
*H. A. Duckman*
ATTORNEY.

Patented Sept. 24, 1940

2,215,659

UNITED STATES PATENT OFFICE 2,215,659

INTERLOCK PIPE COUPLING

Sidney I. Bacon, Long Beach, Calif.

Application October 10, 1939, Serial No. 298,788

6 Claims. (Cl. 285—193)

This invention relates to an interlock pipe coupling of the type in which adjacent sections of pipe are securely connected without the use of a threaded or bolted coupling.

An object of my invention is to provide a novel interlock pipe coupling so constructed and arranged that chemically active gases or liquids in the pipe are prevented from contacting parts of the coupling which might be damaged thereby.

Another object of my invention is to provide a novel interlock pipe coupling, which eliminates all threads or bolts, and which can be quickly and easily assembled at the joint of the pipes, and effectively hold the pipe sections in position.

A feature of my invention resides in the ability of the coupling to yield, thus permitting the adjacent pipe sections to be arranged at a slight angle to each other, if necessary.

Other objects, advantages and features of invention may appear from the accompanying drawing, the subjoined detailed description, and the appended claims.

In the drawing

Figure 1 is a longitudinal, sectional view of my pipe coupling in disassembled position.

Figure 2 is a longitudinal, sectional view of my pipe coupling, assembled around adjacent sections of pipe.

Figure 3 is an end view of my pipe coupling, with the pipe shown in section.

Referring more particularly to the drawing, the pipe sections 1 and 2 are arranged substantially in alignment in the usual and well-known manner. A sleeve 3 fits over the pipe sections 1 and 2, substantially as shown. An annular bead 4 is preferably integrally formed with the sleeve 3, and this bead projects outwardly for a purpose to be further described. One or more packing rings 5, 6 are provided on each side of the bead 4, and fit rather closely around the sleeve 3. A pair of interlocking coupling rings 7, 8 are arranged one on each side of the sleeve 3. These coupling rings are annular, and are made of any suitable material. The internal diameter of the coupling rings are somewhat larger than the outside diameter of the pipe sections.

When the coupling rings 7 and 8 are forced towards each other over the compression rings 5 and 6, these compression rings are compressed into the annular spaces 9 and 10 between the sleeve 3 and the coupling rings, as shown in Figure 2. The substantial compression of the rings 5 and 6 will force them tightly against the sleeve 3, thus effectively holding the pipe sections 1 and 2 in position. By varying the depth of the annular spaces 9 and 10, the pressure against the sleeve 3 can be varied in different couplings to suit the requirements of the particular pipe line. The coupling rings 7 and 8 are interlocked by the following construction:

The ring 7 is provided with an annular groove 11, and the ring 8 is provided with an annular tongue 12. When the rings 7 and 8 are pushed together, as shown in Figure 2, the tongue 12 enters the groove 11, thus interlocking the two coupling rings.

To prevent endwise movement of the coupling rings 7 and 8 when in assembled position, as shown in Figure 2, each of these rings is formed with a tapered seat 13, 14, which form a substantially annular V-groove when the rings are in assembled position. The seats 13 and 14 bear against the bead 4, as shown in Figure 2, thus effectively preventing endwise movement, as stated.

The sleeve 3 can be formed of a suitable material, which will not be attacked by an active liquid or gas within the pipe, and, since this sleeve is continuous across the opening between the pipe, gases and liquids are prevented from seeping outwardly to attack the packing rings 5, 6, or the coupling rings 7, 8. Since the packing rings 5 and 6 are yieldable, a slight angularity can be provided between the adjacent pipe sections, if necessary.

Having described my invention, I claim:

1. An interlock pipe coupling, comprising a sleeve adapted to extend over the pipe, packing rings on said sleeve, a pair of coupling rings encircling the pipe, the inside diameter of said coupling rings being greater than the outside diameter of the pipe, said coupling rings being assembled by endwise movement whereby they fit over the packing rings and compress said packing rings against the sleeve.

2. An interlock pipe coupling, comprising a sleeve adapted to extend over the pipe, packing rings on said sleeve, a pair of coupling rings encircling the pipe, the inside diameter of said coupling rings being greater than the outside diameter of the pipe, said coupling rings being assembled by endwise movement whereby they fit over the packing rings and compress said packing rings against the sleeve, an interlocking means on said coupling rings, said interlocking means engaging when the coupling rings are in assembled position.

3. An interlock pipe coupling, comprising a sleeve adapted to extend over the pipe, packing rings on said sleeve, a pair of coupling rings encircling the pipe, the inside diameter of said coupling rings being greater than the outside diameter of the pipe, said coupling rings being assembled by endwise movement whereby they fit over the packing rings and compress said packing rings against the sleeve, a bead on the sleeve, said coupling rings having seats therein adapted to bear against the bead when the coupling rings are in assembled position, whereby endwise movement of the assembled coupling rings is prevented.

4. An interlock pipe coupling, comprising a sleeve adapted to extend over the pipe, packing rings on said sleeve, a pair of coupling rings encircling the pipe, the inside diameter of said coupling rings being greater than the outside diameter of the pipe, said coupling rings being assembled by endwise movement whereby they fit over the packing rings and compress said packing rings against the sleeve, an interlocking means on said coupling rings, said interlocking means engaging when the coupling rings are in assembled position, a bead on the sleeve, said coupling rings having seats therein adapted to bear against the bead when the coupling rings are in assembled position, whereby endwise movement of the assembled coupling rings is prevented.

5. An interlock pipe coupling, comprising a sleeve adapted and arranged to encircle the pipe, a packing ring encircling the sleeve adjacent each end thereof, a pair of coupling rings, the inside diameter of the coupling rings being greater than the outside diameter of the pipe, one of said coupling sleeves having an annular groove on the inter-end thereof, the other coupling ring having a tongue projecting from the inner end thereof, said tongue entering the groove in assembled position of the coupling rings, said coupling rings compressing the packing rings against the sleeve in assembled position of the coupling.

6. An interlock pipe coupling, comprising a sleeve adapted and arranged to encircle the pipe, a packing ring encircling the sleeve adjacent each end thereof, a pair of coupling rings, the inside diameter of the coupling rings being greater than the outside diameter of the pipe, one of said coupling sleeves having an annular groove on the inter-end thereof, the other coupling ring having a tongue projecting from the inner end thereof, said tongue entering the groove in assembled position of the coupling rings, said coupling rings compressing the packing rings against the sleeve in assembled position of the coupling, an annular bead extending outwardly from the sleeve, each of said coupling rings having a seat formed therein, engaging the bead in assembled position of the coupling.

SIDNEY I. BACON.